(12) United States Patent
Luo et al.

(10) Patent No.: US 10,933,480 B2
(45) Date of Patent: Mar. 2, 2021

(54) SYSTEM AND METHODS OF MULTIPLE ELECTRODE ELECTRIC DISCHARGE MACHINING

(71) Applicant: General Electric Company, Schenectady, NY (US)

(72) Inventors: Yuanfeng Luo, Rexford, NY (US); Richard Leigh Adrian, Mason, OH (US); Allan Richard Bridges, Batavia, OH (US); Nouman Usmani, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 860 days.

(21) Appl. No.: 15/429,943

(22) Filed: Feb. 10, 2017

(65) Prior Publication Data
US 2018/0229319 A1   Aug. 16, 2018

(51) Int. Cl.
| | |
|---|---|
| B23H 1/02 | (2006.01) |
| B23H 1/04 | (2006.01) |
| B23H 7/18 | (2006.01) |

(52) U.S. Cl.
CPC .............. *B23H 1/028* (2013.01); *B23H 1/04* (2013.01); *B23H 7/18* (2013.01)

(58) Field of Classification Search
CPC ............. B23H 1/028; B23H 1/04; B23H 7/18
(Continued)

(56) References Cited

U.S. PATENT DOCUMENTS

| 3,472,994 A | 10/1969 | Sennowitz | |
|---|---|---|---|
| 4,450,337 A * | 5/1984 | Inoue | B23H 1/024 219/69.16 |

(Continued)

FOREIGN PATENT DOCUMENTS

| GB | 2220162 | * | 1/1990 |
|---|---|---|---|
| GB | 2220162 A | | 1/1990 |

OTHER PUBLICATIONS

Fuzhu Han et al., "Development of parallel spark electrical discharge machining", Precision Engineering, vol. 28, Issue: 1, pp. 65-72, Jan. 2004.
(Continued)

*Primary Examiner* — Dana Ross
*Assistant Examiner* — Joseph W Iskra
(74) *Attorney, Agent, or Firm* — Armstrong Teasdale LLP

(57) ABSTRACT

An electric discharge machining (EDM) system includes an electrode set having a plurality of electrodes. Each electrode is electrically-isolated from the other electrodes. The EDM system includes a power supply configured to generate an electric discharge between a workpiece and the electrode set to remove material from the workpiece. The power supply includes a multi-loop driver system and an AC-to-DC component that outputs DC electric power. The multi-loop driver system includes a plurality of power loop circuits coupled to an output of the AC-to-DC component. Each power loop circuit is electrically-isolated from other power loop circuits and is coupled to at least one electrode. The multi-loop driver system includes a drive controller coupled to the power loop circuits. The drive controller is configured to transmit at least one control signal to at least one power loop circuit to drive the AC-to-DC component to generate the electric discharge.

16 Claims, 5 Drawing Sheets

(58) Field of Classification Search
USPC .................................................. 219/69.13
See application file for complete search history.

(56) References Cited

U.S. PATENT DOCUMENTS

| | | | |
|---|---|---|---|
| 5,089,681 A * | 2/1992 | El-Menshawy | B23H 1/028 |
| | | | 219/69.16 |
| 6,369,343 B1 | 4/2002 | Krenz et al. | |
| 8,525,064 B2 | 9/2013 | Itoh et al. | |
| 8,963,041 B2 | 2/2015 | Luo | |
| 2007/0023399 A1* | 2/2007 | Buhler | B23H 1/022 |
| | | | 219/69.18 |
| 2008/0063566 A1* | 3/2008 | Matsumoto | G01N 33/5438 |
| | | | 422/68.1 |
| 2012/0211357 A1 | 8/2012 | Trimmer et al. | |

OTHER PUBLICATIONS

E. Uhlmann et al., "Investigations on Vibration-Assisted EDM-Machining of Seal Slots in High-Temperature Resistant Materials for Turbine Components", Proceedings of the Seventeenth CIRP Conference on Electro Physical and Chemical Machining (ISEM), vol. 6, pp. 71-76, 2013.

* cited by examiner

SYSTEM AND METHODS OF MULTIPLE ELECTRODE ELECTRIC DISCHARGE MACHINING

BACKGROUND

The present disclosure relates generally to electric discharge machining (EDM) and, more particularly, to multiple electrode EDM die sinking systems and methods of machining therewith.

EDM machining, and in particular EDM die sinking, is typically used to fabricate a variety of difficult structures in difficult to machine materials. In at least some known EDM machining operations, a workpiece is placed into a tank of fluid, such as hydrocarbon-based oil. An electrode having, for example, a mirror image of the desired component or a cavity shape of the desired cavity in a component, is moved by a ram in proximity to the workpiece. An electric pulse is then applied to the gap between the electrode and the workpiece to generate electric discharges that facilitate removing material from the workpiece. However, at least some known EDM machining systems have low material removal rates due, in part, to a limitation that only one pulse can be generated at a time. As a result, even though multiple electrodes may be used in some EDM systems, they have little to no possibility to discharge at the same time because they share the same control signal and the electrode connections are not electrically isolated from each other. As such, only one electrode of the multiple electrode tool can discharge to remove material during a given pulse. In addition, after the initial discharge period, there is a period during which no discharging takes place before beginning the process again. This leads to a slow machining process speed.

BRIEF DESCRIPTION

In one aspect, an electric discharge machining (EDM) system is provided. The EDM system includes an electrode set including a plurality of electrodes. Each electrode of the plurality of electrodes is electrically-isolated from other electrodes of the plurality of electrodes. In addition, the EDM system includes a power supply configured to generate an electric discharge between a workpiece and the electrode set to remove material from the workpiece. The power supply includes an AC-to-DC component configured to output DC electric power. The power supply also includes a multi-loop driver system. The multi-loop driver system includes a plurality of power loop circuits coupled to an output of the AC-to-DC component. Each power loop circuit of the plurality of power loop circuits is electrically-isolated from other power loop circuits, and each power loop circuit is coupled to at least one electrode of the plurality of electrodes. The multi-loop driver system also includes a drive controller coupled to the plurality of power loop circuits. The drive controller is configured to transmit at least one control signal to at least one power loop circuit of the plurality of power loop circuits to drive the AC-to-DC component to generate the electric discharge.

In another aspect, another electric discharge machining (EDM) system is provided. The EDM system includes an electrode set including a plurality of electrodes. Each electrode of the plurality of electrodes is electrically-isolated from other electrodes of the plurality of electrodes. In addition, the EDM system includes a power supply including an AC-to-DC component configured to output DC electric power. The power supply also includes a plurality of power loop circuits coupled to an output of the AC-to-DC component. Each power loop circuit of the plurality of power loop circuits is electrically-isolated from other power loop circuits, and each power loop circuit is coupled to at least one electrode of the plurality of electrodes. Each power loop circuit is configured to transmit pulsed DC electric power to the at least one electrode independent of each other power loop circuit. The EDM system also includes a translation apparatus coupled to the electrode set and configured to adjust a position of the electrode set relative to a workpiece, and a controller coupled to the translation apparatus and the power supply. The controller is configured to control the translation apparatus to adjust a position of the electrode set relative to the workpiece based on an amount of gap voltage measured between the electrode set and the workpiece.

In another aspect, a method for forming a seal slot in a workpiece is provided. The method includes placing a workpiece in an EDM system for machining, and positioning the workpiece a predetermined distance from an electrode set for the EDM system to perform machining operations on the workpiece. The electrode set includes a plurality of electrodes. Each electrode of the plurality of electrodes is electrically-isolated from other electrodes of the plurality of electrodes. The method also includes activating a power supply to generate one or more electric discharges between the workpiece and the electrode set for material removal from the workpiece. The power supply includes a plurality of power loop circuits, where each power loop circuit of the plurality of power loop circuits is electrically-isolated from other power loop circuits. Each power loop circuit is also coupled to at least one electrode of the plurality of individual, electrically-isolated electrodes. In addition, each power loop circuit is configured to transmit pulsed DC electric power to the at least one electrode independent of at least one other power loop circuit. Moreover, the method includes adjusting a position of the workpiece relative to the electrode set until a predetermined shape of the workpiece is achieved.

DRAWINGS

These and other features, aspects, and advantages of the present disclosure will become better understood when the following detailed description is read with reference to the accompanying drawings in which like characters represent like parts throughout the drawings, wherein.

Figure 1:
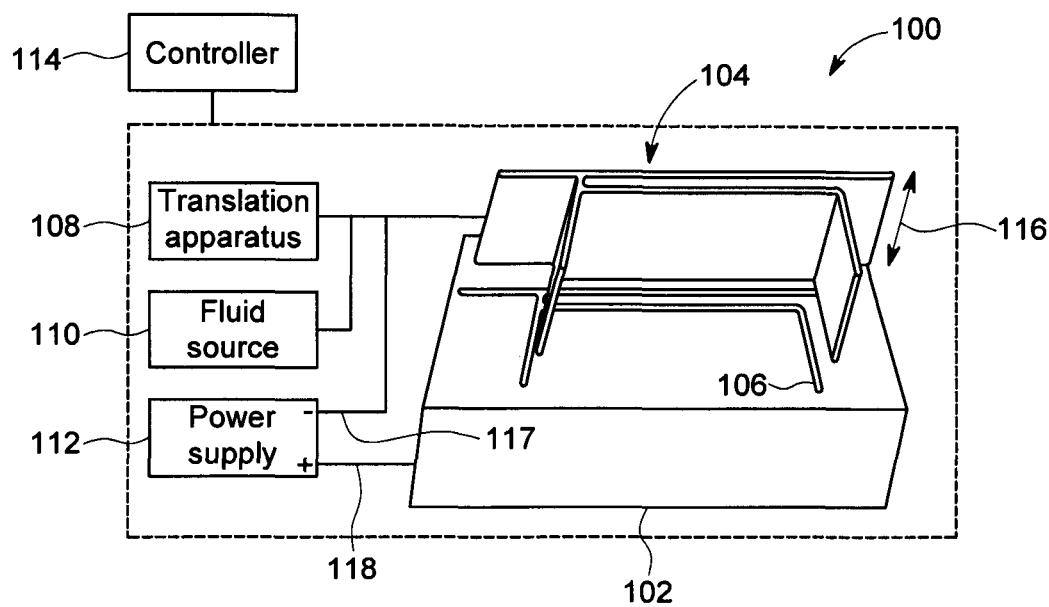
FIG. 1 is a schematic view of an exemplary embodiment of an electric discharge machining (EDM) system for machining a workpiece.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged; such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Embodiments of the present disclosure provide systems and methods to facilitate increased productivity for electrical discharge machining (EDM) ceramic matrix composite (CMC) materials and other difficult to machine materials. In particular, the systems and methods described herein facilitate CMC seal slot machining. An electrode set or array uses multiple electrodes, where each electrode is controlled individually to facilitate increasing the speed of manufacturing, and increasing the discharge efficiency of EDM machining.

FIG. 1 is a schematic view of an exemplary embodiment of an electric discharge machining (EDM) system 100 for machining a workpiece 102. In the exemplary embodiment, EDM system 100 is configured for electromachining workpiece 102 by applying an electric discharge to workpiece 102 by one or more electrodes in an electrode set 104 to remove material from workpiece 102. In particular, EDM system 100 facilitates forming a seal slot 106 in workpiece 102. The exemplary workpiece 102 is, for example, and without limitation, a shroud for use in a gas turbine engine (not shown).

In the exemplary embodiment, workpiece 102 and electrode set 104 are fabricated from an electrically conductive material. Workpiece 102 is fabricated from, for example, materials that are difficult to machine using conventional machining techniques, such as heat resistant, nickel-based alloys such as Inconel, ceramic matrix composite, various superalloys, and the like. Alternatively, workpiece 102 is fabricated from any conductive material that enables EDM system 100 to function as described herein. Electrode set 104 is fabricated from a conductive material that includes, for example, and without limitation, graphite, metals such as brass/zinc, tellurium copper, copper tungsten, silver tungsten, tungsten, and combinations thereof. In alternative embodiments, electrode set 104 is formed from any conductive material that enables EDM system 100 to function as described herein.

In the exemplary embodiment, EDM system 100 also includes a translation apparatus 108, a fluid source 110, a power supply 112, and a controller 114. Furthermore, in some embodiments, EDM system 100 includes any additional component that enables EDM system 100 to function as described herein. In the exemplary embodiment, EDM system 100 is a die-sinking device. Translation apparatus 108 is coupled to and configured to move electrode set 104 relative to workpiece 102. For example, and without limitation, translation apparatus 108 moves electrode set 104 longitudinally along path 116. In the exemplary embodiment, path 116 extends substantially along an edge of electrode set 104 to perform a plunge-style machining technique of workpiece 102. In alternative embodiments, EDM system 100 includes any translation apparatus 108 that enables EDM system 100 to function as described herein.

Fluid source 110 is coupled to electrode set 104 and is configured to provide dielectric fluid during operation of EDM system 100. In particular, fluid source 110 includes a liquid such as, without limitation, water, de-ionized water, oil, hydrocarbon-based oil, a liquid containing an electrolyte, and/or other dielectric liquids. Fluid source 110 is configured to circulate the dielectric fluid between electrode set 104 and workpiece 102. In alternative embodiments, EDM system 100 includes any fluid source 110 that enables EDM system 100 to function as described herein. In the exemplary embodiment, the dielectric fluid supplied by fluid source 110 is used to, among other things, maintain media insulation before each electric discharge, capture material particles removed from workpiece 102, and facilitate dispersing heat.

In the exemplary embodiment, power supply 112 is coupled to electrode set 104 and workpiece 102 and configured to provide electrical current to at least one of electrode set 104 and workpiece 102 to induce at least one electrical arc between electrode set 104 and workpiece 102. As used herein, the terms "electrical arc" and "arcing" refer to a localized release of electrical energy. In the exemplary embodiment, power supply 112 is coupled to electrode set 104 by a suitable electrical lead 117, and to workpiece 102 by a suitable electrical lead 118 such that electrode set 104 has a negative charge, i.e., forms a cathode, and workpiece 102 has a positive charge, i.e., forms an anode. In alternate embodiments, the polarity is reversed with an anode electrode set 104 and a cathode workpiece 102. In the exemplary embodiment, power supply 112 is a direct current (DC) power supply.

In addition, in the exemplary embodiment, controller 114 is coupled in communication to the components of EDM system 100 to control the machining of workpiece 102. For example, controller 114 is coupled in communication to and regulates the movement of electrode set 104 by translation apparatus 108. In addition, controller 114 is coupled in communication to and regulates power supply 112 to control electrical arcing between electrode set 104 and workpiece 102. In some embodiments, controller 114 includes a computer numerical controlled (CNC) drive configured to regulate operation of translation apparatus 108. In alternative embodiments, system 100 includes any controller type that enables system 100 to function as described herein.

Figure 2:
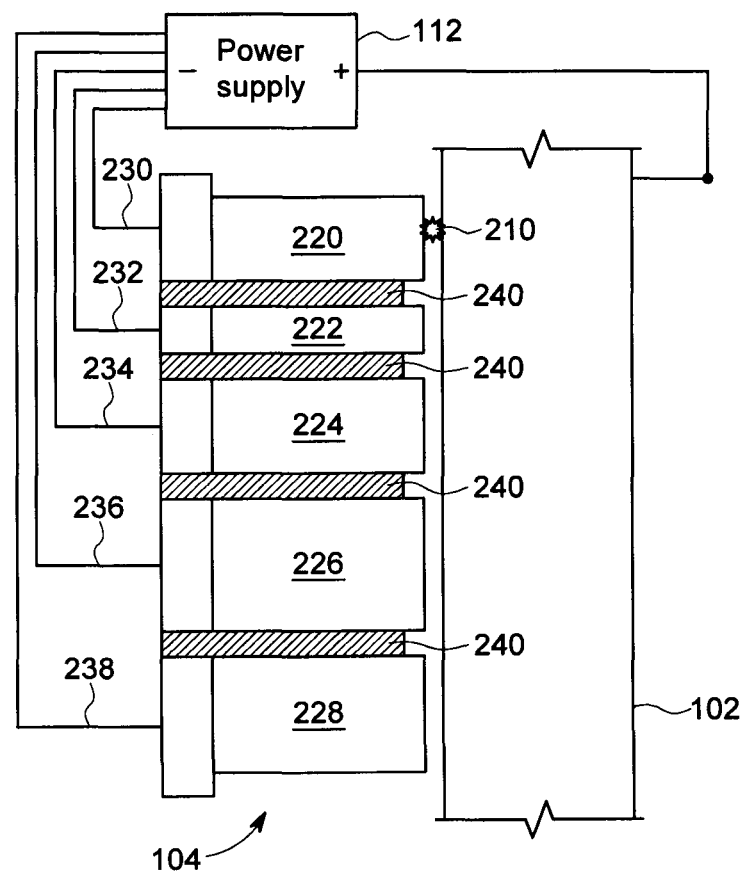
FIG. 2 is a schematic view of an electrode set for use in the EDM system shown in FIG. 1.

FIG. 2 is a schematic view of electrode set 104 for use in EDM system 100 (shown in FIG. 1) for machining workpiece 102. In the exemplary embodiment, workpiece 102 is positioned proximate electrode set 104, which includes individual, electrically-isolated electrodes 220, 222, 224, 226, and 228. Each electrode 220, 222, 224, 226, and 228 is electrically insulated from an adjacent electrode by an insulator component 240, for example, and without limitation, a polymer layer. Alternatively, electrode set 104 does not include insulator components 240 between electrodes 220, 222, 224, 226, and 228. In the exemplary embodiment, electrodes 220, 222, 224, 226, and 228 are each coupled individually to power supply 112 through a discrete, electrically-isolated power loop circuit, for example power loop circuits 230, 232, 234, 236, and 238, respectively. In alternative embodiments, one or more of electrodes 220, 222, 224, 226, and 228 is coupled to any power loop circuit of power supply 112. For example, and without limitation, in one alternative embodiment, electrodes 220, 224, and 228 are each coupled to power loop circuit 230, and electrodes 222 and 226 are each coupled to power loop circuit 232. In the exemplary embodiment, power supply 112 generates an electric discharge, for example electric discharge 210, between each electrode 220, 222, 224, 226, and 228, independently of other electrodes 220, 222, 224, 226, and 228, using electrically-isolated power loop circuits 230, 232, 234, 236, and 238 to facilitate removing material from workpiece 102.

Figure 3:
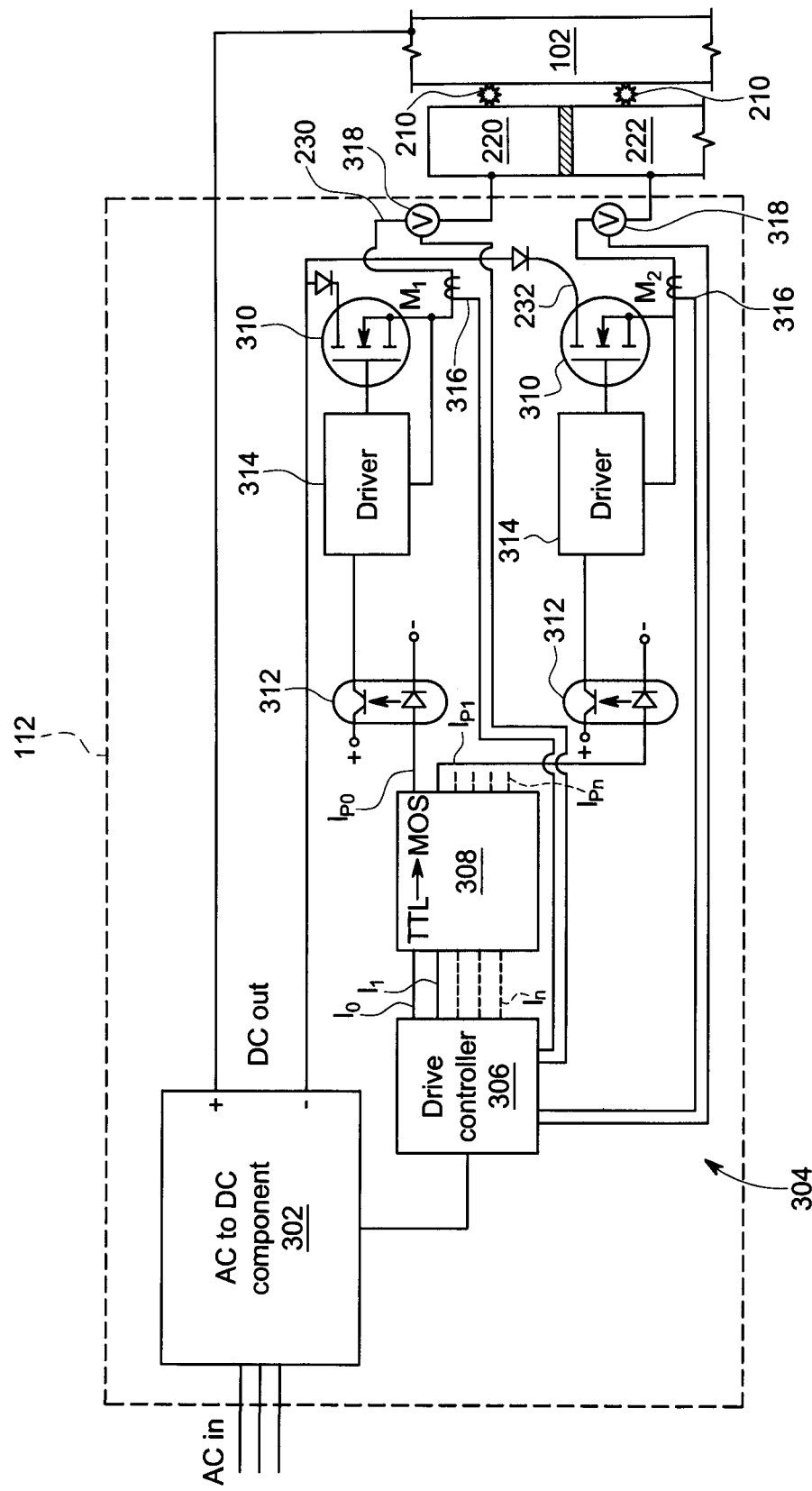
FIG. 3 is a schematic view of a power supply for use in the EDM system shown in FIG. 1, and showing two power loop circuits.

FIG. 3 is a schematic view of power supply 112 illustrating power loop circuits 230 and 232. In the exemplary embodiment, power supply 112, as described above, is a direct current (DC) power supply configured to convert alternating current (AC) electric power into DC electric power. In the exemplary embodiment, the voltage of the AC electric power received by power supply 112 has three phases and is rated at approximately 220 Volts AC (VAC). Alternatively, power supply 112 receives AC electric power from any type of source having various characteristics, for example, and without limitation, single phase AC electric power at approximately 120 VAC. In the exemplary embodiment, power supply 112 includes an AC-to-DC component 302 configured to convert the received AC electric power into DC electric power. AC-to-DC component 302 includes, for example, and without limitation, a transformer (not shown) and a rectifier (not shown). In the exemplary embodiment, power supply 112 also includes a multi-loop driver system 304 configured to drive AC-to-DC component 302.

In the exemplary embodiment, multi-loop driver system 304 includes a drive controller 306 operatively coupled to a transistor-transistor logic (TTL) to metal-oxide-silicon (MOS) driver 308 (TTL-to-MOS driver). Drive controller 306 contains a processor and memory (neither shown) and is configured to transmit one or more TTL logic signals (broadly control signals), such as signals $I_0, I_1, \ldots, I_n$ to TTL-to-MOS driver 308. Drive controller 306 is a computing device that is configured to transmit, for example, signals $I_0, I_1, \ldots, I_n$ to TTL-to-MOS driver 308 to facilitate controlling the pulse interval and duration of AC-to-DC component 302 supplied to electrodes 220 and 222 by power loop circuits 230 and 232, respectively. TTL-to-MOS driver 308 is configured to receive TTL signals $I_0, I_1, \ldots, I_n$ and transmit MOS signals $I_{p0}, I_{p1}, \ldots, I_{pn}$ having increased current and increased voltage output levels suitable for driving MOS circuits.

TTL-to-MOS driver 308 is operatively coupled to a plurality of transistors 310 to control the switching between an "ON state" and an "OFF state" of transistors 310. In the exemplary embodiment, only two transistors 310 are shown, for example a first transistor $M_1$ and a second transistor $M_2$, however, it is contemplated that any number of transistors 310 is coupled to TTL-to-MOS driver 308 that enables power supply 112 to function as described herein. For example, and without limitation, each of first transistor $M_1$ and second transistor $M_2$ is operatively coupled to TTL-to-MOS driver 308 and configured to receive one of MOS signals $I_{p0}, I_{p1}, \ldots, I_{pn}$. In the exemplary embodiment, first transistor $M_1$ and second transistor $M_2$ are coupled in parallel and are configured to quickly switch between an ON state and an OFF state to generate the pulse of DC electric power supplied to electrodes 220 and 222 through respective power loop circuits 230 and 232. In one embodiment, the plurality of transistors 310 are a metal-oxide-silicon field-effect type transistor (i.e., a MOSFET). Alternatively, the plurality of transistors 310 is any type of transistor that enables power supply 112 to function as described herein, for example, and without limitation, an insulated-gate bipolar transistor (IGBT).

In the exemplary embodiment, multi-loop driver system 304 also includes a plurality of optoisolators 312. Each optoisolator 312 is coupled between TTL-to-MOS driver 308 and a respective transistor 310. Optoisolators 312 are configured to electrically isolate the plurality of transistors 310 from drive controller 306. Multi-loop driver system 304 also includes a plurality of driver components 314, where each driver component 314 is coupled between a respective optoisolator 312 and transistor 310, for example first transistor $M_1$ and second transistor $M_2$. The plurality of driver components 314 are configured to transmit a current necessary to trigger a change in the operating state of transistors 310.

Furthermore, multi-loop driver system 304 also includes a plurality of current sensors 316 operatively coupled to transistors 310 and drive controller 306 for sensing an amount of current flowing through each respective transistor 310. In one embodiment, if an amount of current flowing through a respective transistor 310 exceeds a predetermined threshold value, drive controller 306 switches transistor 310 to the OFF state. In some embodiments, the predetermined threshold value corresponds to a physical limitation of transistor 310. Alternatively, the predetermined threshold value is any value that enables power supply 112 to function as described herein.

Optionally, or in addition, in one embodiment, multi-loop driver system 304 includes a plurality of voltage sensors 318 operatively coupled to transistors 310 and drive controller 306 for sensing an amount of gap voltage between the electrodes and the workpiece, for example, and without limitation, between electrode 220 and workpiece 102, and between electrode 222 and workpiece 102. In one embodiment, the measured gap voltage feedback is used by drive controller 306 to detect the discharge status of each of electrodes 220 and 222, for example, to determine when to start the pulse of DC electric power supplied to electrodes 220 and 222, particularly if electrodes 220 and 222 are pulsed out of phase. In addition, in some embodiments, the measured gap voltage feedback is used by drive controller 306 to adjust the pulse duration and/or interval, as well as switch transistors 310 between the ON state and the OFF state, and/or used by controller 114 to adjust a relative position of electrode set 104 with respect to workpiece 102.

Figure 4:
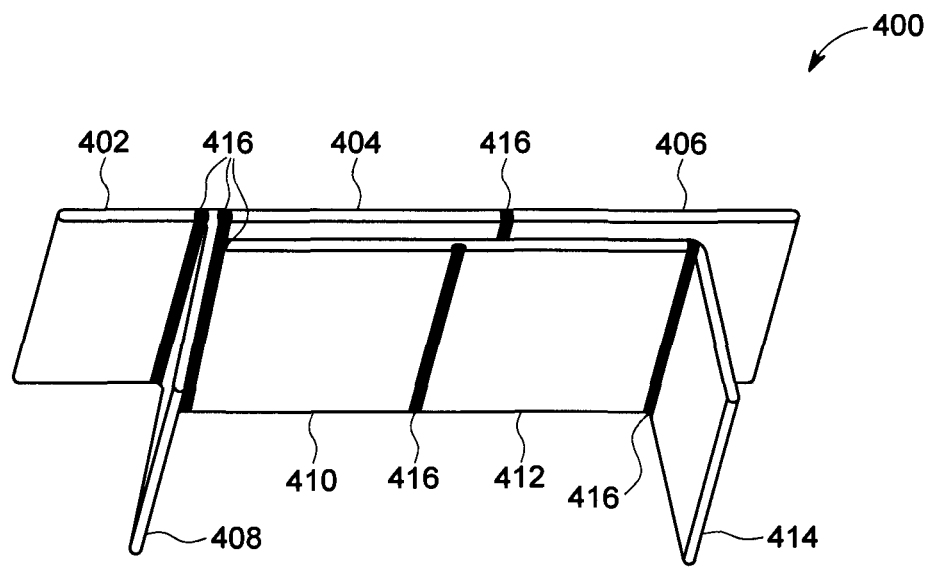
FIG. 4 is a perspective view of an electrode array that may be used in the EDM system shown in FIG. 1.
Figure 5:
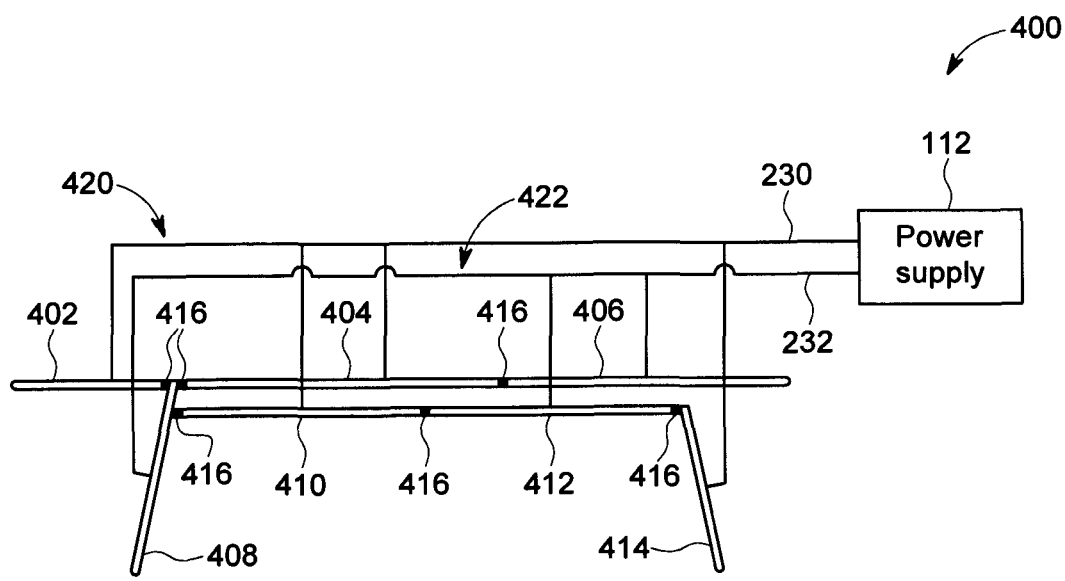
FIG. 5 is a plan view of the electrode array shown in FIG. 4.

FIG. 4 is a perspective view of an electrode array 400 that may be used in EDM system 100 (shown in FIG. 1). FIG. 5 is a plan view of electrode array 400. In the exemplary embodiment, electrode array 400 is an array of electrodes configured to replace a single seal slot electrode (not shown). Electrode array 400 is configured for seal slot machining, for example, in workpiece 102 (shown in FIG. 1), and includes a plurality of individual, electrically-isolated electrodes 402, 404, 406, 408, 410, 412, and 414. In the exemplary embodiment, the complex shape of the single seal slot electrode is replaced by seven electrode fabricated from substantially planar plate and/or sheet material, which facilitate ease of fabrication of electrode array 400 and reduce the fabrication cost. In the exemplary embodiment, each of electrodes 402, 404, 406, 408, 410, 412, and 414 is coupled to as adjacent electrode by an insulator component 416, for example, and without limitation, a polymer material. Alternatively, electrode array 400 may not include insulator components 416, and electrodes 402, 404, 406, 408, 410, 412, and 414 may be coupled to a base component (not shown) that facilitates holding each of electrodes 402, 404, 406, 408, 410, 412, and 414 in position relative to each other, while maintaining electrical isolation of each electrode 402, 404, 406, 408, 410, 412, and 414.

Individual electrodes 402, 404, 406, 408, 410, 412, and 414 are fabricated from a conductive material that includes, for example, and without limitation, graphite, metals such as brass/zinc, copper, tellurium copper, copper tungsten, silver tungsten, tungsten, and/or combinations thereof. In alternative embodiments, electrode set 104 is formed from any conductive material that enables EDM system 100 to function as described herein.

In one embodiment, electrodes 402, 404, 406, 408, 410, 412, and 414 are coupled to power supply 112 in two separate groups. For example, electrodes 402, 404, 410, and 414 are coupled to power supply 112 by discrete, electrically-isolated power loop circuit 230 to form a first group 420. Electrodes 406, 408, and 412 are coupled to power supply 112 by discrete, electrically-isolated power loop circuit 232 to form a second group 422. In such an embodiment, first group 420 and second group 422 have DC electric power supplied to the respective groups 420 and 422 having a different phase of ON/OFF time, as further described herein. In each respective group 420 and 422, respective electrodes have substantially the same discharge duration, discharge current, and pulse interval, such that the respective electrode discharge in parallel. In this embodiment, first group 420 and second group 422 include electrodes chosen such that no two are adjacent. For example, and without limitation, the respective electrodes 402, 404, 410, and 414 of first group 420 are spaced apart from each other, having either an electrode from second group 422 or a portion of workpiece 102 (not shown in FIGS. 4 and 5) positioned therebetween. This facilitates spacing discharges away from each other, which allows increased amounts of fresh dielectric fluid to surround each respective electrode. In addition, the different phase of ON/OFF time provides additional time for the dielectric fluid to recover before a subsequent discharge. Moreover, because each group 420 and 422 is discharging at a different time, for any given period between the ON state and OFF state time of the groups 420 and 422, material debris only needs to flushed away from a electrodes of the particular group 420 or 422 that completed a discharge cycle.

In an alternative embodiment, each of electrodes 402, 404, 406, 408, 410, 412, and 414 is coupled to a respective discrete power loop circuit of power supply 112. This facilitates complete individual control of the timing, duration, current, and interval of each of electrodes 402, 404, 406, 408, 410, 412, and 414. In one particular embodiment, electrodes 402, 404, 406, 408, 410, 412, and 414 may receive DC electric power from power supply 112 in a sequential manner, wherein the timing and interval of each pulse is determined such that no two electrodes are discharging at the same time. In such an embodiment, material debris only needs to be flushed away from a single electrode 402, 404, 406, 408, 410, 412, or 414 that completed a discharge cycle.

Figure 6:
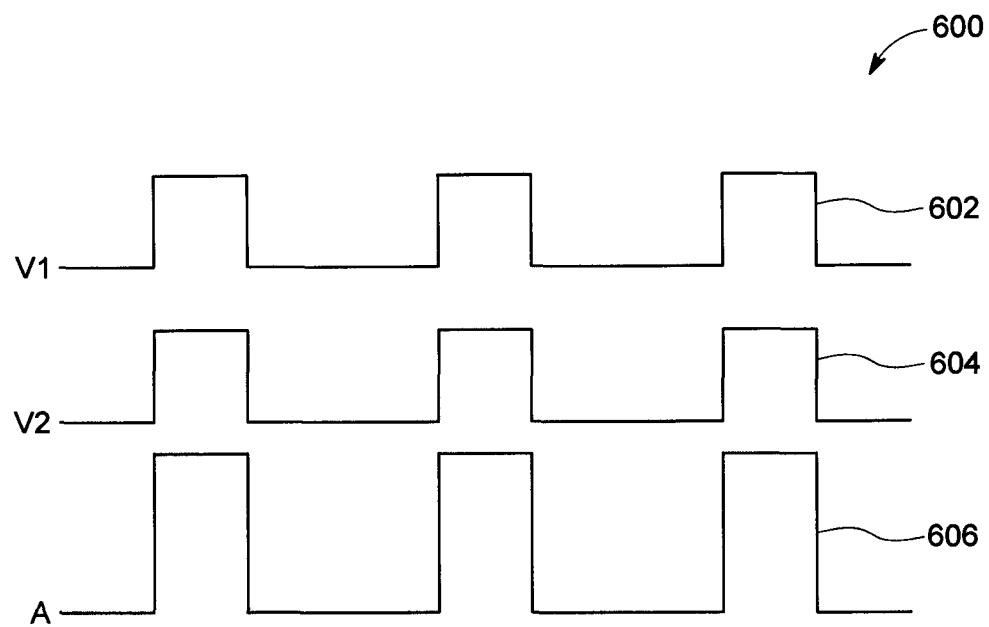
FIG. 6 is a waveform control strategy that can be used with the EDM system shown in FIG. 1.

FIG. 6 is a waveform control strategy 600 that can be used with EDM system 100 (shown in FIG. 1). In the exemplary embodiment, and with reference to FIGS. 3 and 6, waveform control strategy 600 is an in phase, simultaneous discharge pattern and includes a first waveform 602 that corresponds to the DC electric power supplied to electrode 220, and a second waveform 604 that corresponds to the DC electric power supplied to electrode 222, such that first and second waveforms 602 and 604 are in phase. In particular, power supply 112 generates a simultaneous and substantially similar discharge duration, discharge current, and pulse interval to each of electrodes 220 and 222, as indicated by waveforms 602 and 604, respectively. For example, power supply 112 generates a voltage pulse at the same voltage amplitude through each of power loop circuits 230 and 232. This facilitates providing each of electrodes 220 and 222, for example, with a substantially similar discharge duration and current, which generates a respective electric discharge 210 of substantially the same strength and duration between each electrode 220 and 224, and workpiece 102. This facilitates improved material removal rates of workpiece 102. In addition, waveform control strategy 600 facilitates improved efficiency by supplying an increased amount of electric power from power supply 112 to workpiece 102, as is indicated by a current waveform 606, which shows the average current received by workpiece 102 under waveform control strategy 600. Because each of electrodes 220 and 222 have a substantially similar discharge duration, discharge current, and pulse interval, the total current received by workpiece 102 increases, as compared to an individual electrode.

Figure 7:
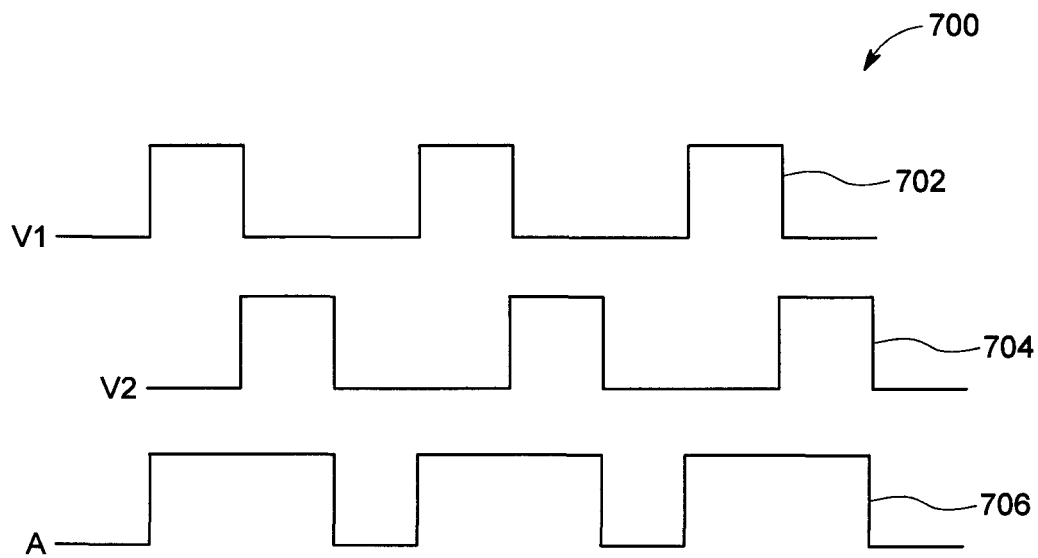
FIG. 7 is an alternative waveform control strategy that can be used with the EDM system shown in FIG. 1.

FIG. 7 is an alternative waveform control strategy 700 that can also be used with EDM system 100 (shown in FIG. 1). In the exemplary embodiment, and with reference to FIGS. 3 and 7, waveform control strategy 700 is an out of phase, sequential discharge pattern and includes a first waveform 702 that corresponds to the DC electric power supplied to electrode 220, and a second waveform 704 that corresponds to the DC electric power supplied to electrode 222, such that first and second waveforms 702 and 704 are out of phase. In particular, power supply 112 generates the pulse interval at different time instances for each of electrodes 220 and 222. In such an embodiment, power supply 112 maintains the same discharge energy for each electrode 220 and 222, and in particular, the same discharge duration and current. That is, electric discharges 210 last the same duration, but start and stop at different times. The discrete, electrically-isolated power loop circuits 230 and 232 of power supply 112 facilitates the uniform but unsynchronized discharges between electrodes 220 and 222, and workpiece 102. This facilitates improved material removal rates of workpiece 102. A shown by a current waveform 706, workpiece 102 receives an increased duration of current application to facilitate removing material, as compared to an individual electrode. In addition, waveform control strategy 700 facilitates part fabrication by providing more time for the dielectric fluid to relax and for flushing of material debris from workpiece 102 due to the staggered waveforms 702 and 704. That is, the sequential/staggered waveforms 702 and 704 facilitate an increased interval before electric discharges the individual electrodes 220 and 222.

Figure 8:
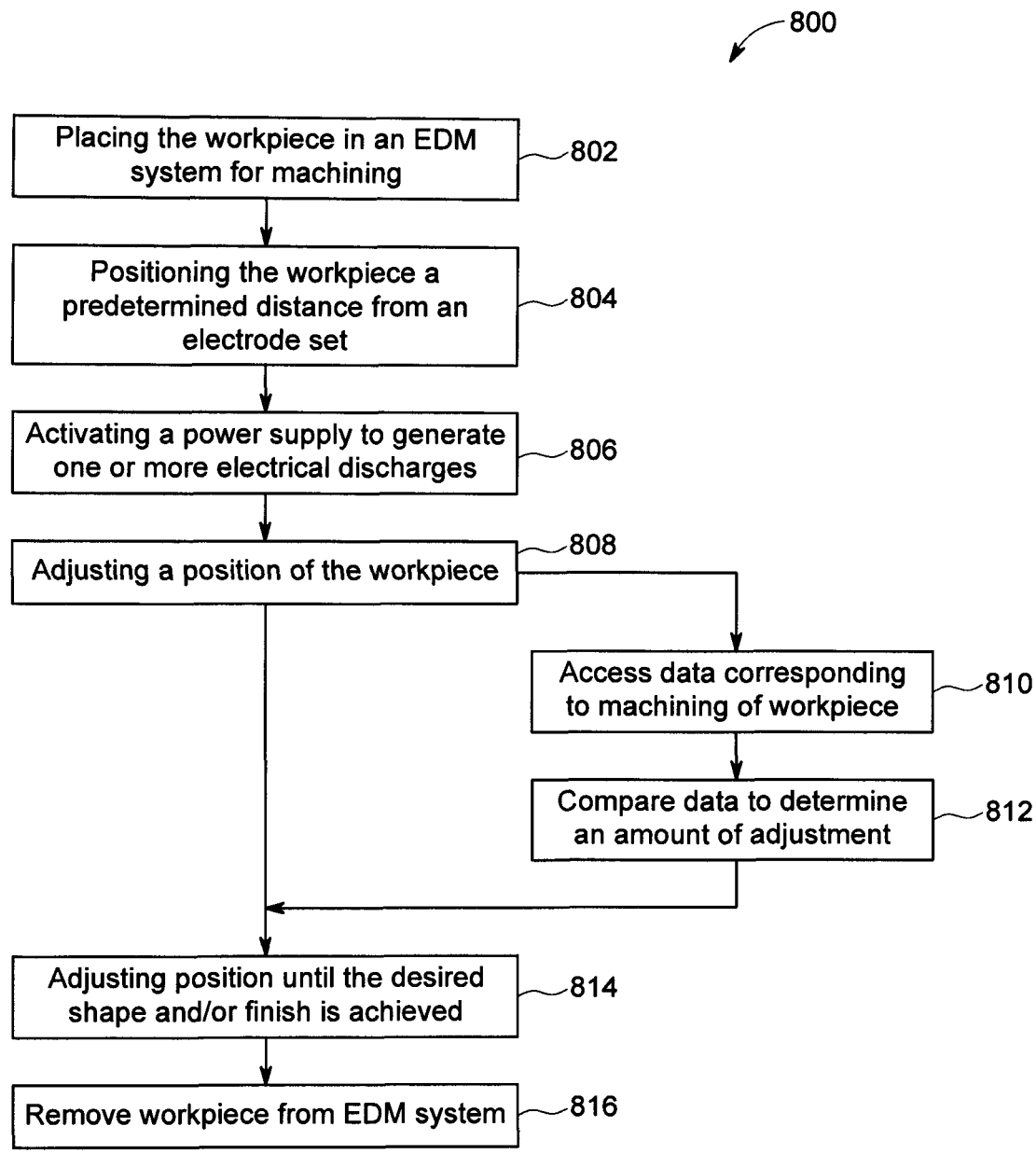
FIG. 8 is a flow diagram of an exemplary method for forming a seal slot in a workpiece 102.

FIG. 8 is a flow diagram of an exemplary method 800 for forming seal slot 106 (shown in FIG. 1) in workpiece 102 (shown in FIG. 1). In the exemplary method 800, and with reference to FIGS. 1-8, workpiece 102 is placed 802 in EDM system 100 for machining/processing by EDM system 100. A user and/or controller 114 positions 804 workpiece 102 proximate electrode set 104 at a predetermined distance sufficient for EDM system 100 to perform machining/processing operations on workpiece 102. For example, and without limitation, workpiece 102 is positioned at a distance with respect to each of electrodes 220, 222, 224, 226, and 228 such that power supply 112 supplies sufficient DC electric power to electrodes 220, 222, 224, 226, and 228 to affect a safe and efficient electric discharge 210 for material removal. In one embodiment, controller 114 send commands to translation apparatus 108 to adjust the relative position of workpiece 102 and electrode set 104.

After workpiece 102 is sufficiently positioned relative to electrode set 104, controller 114 activates 806 power supply 112 to generate one or more electric discharges 210 between workpiece 102 and electrode set 104 for material removal. In one embodiment, translation apparatus 108 may move and/or adjust 808 electrode set 104 during machining based on commands received from controller 114. For example, and without limitation, in one embodiment, drive controller 306 and/or controller 114 accesses 810 one or more of a data table, feedback from current sensors 316, feedback from voltage sensors 318, waveform data associated with one or more of TTL logic signals $I_0, I_1, \ldots, I_n$, etc. Drive controller 306 and/or controller 114 compares 812 data obtained from these sources (e.g., current sensors 316, voltage sensors 318, etc.) to determine an amount of adjustment of workpiece 102 relative to electrode set 104 during machining/processing, and/or the duration, discharge current, and pulse interval for each of electrodes 220, 222, 224, 226, and 228. Workpiece 102 is adjusted 814 relative to electrode set 104 until the desired shape of workpiece 102 is achieved. Workpiece 102 is removed 816 from EDM system 100 once it has attained the desired shape.

The embodiments described herein relate to systems and methods for EDM machining of a workpiece, such as fabricating seal slots, using an EDM process. In particular, an electrode set having a plurality of individual, electrically-isolated electrodes and a power supply including a multi-loop driver system having a plurality of discrete power loop circuits is used to machine and/or process the workpiece. The multi-loop driver system is configured to drive each power loop circuit of the power supply with substantially the same pulse duration, discharge current, and pulse interval to facilitate improved machining speed of the workpiece being machined. In addition, the efficiency of the EDM system is improved by increasing the average amount of electric power supplied to the workpiece from power supply during machining.

An exemplary technical effect of the systems and methods described herein includes at least one of: (a) reducing the time to manufacture components; (b) increasing a material removal rate of the components; (c) providing complete independent control of individual electrodes of the EDM system, without sacrificing the discharge power of the electrodes; and (d) increasing the efficiency of the EDM machining processes.

Exemplary embodiments of methods and systems are not limited to the specific embodiments described herein, but rather, components of systems and steps of the methods may be utilized independently and separately from other components and steps described herein. For example, the methods may also be used to manufacture other components, and are not limited to practice with only the components and methods as described herein. Rather, the exemplary embodiment can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric discharge machining (EDM) system comprising:
    an electrode set comprising a plurality of electrodes, each electrode of said plurality of electrodes electrically-isolated from other electrodes of said plurality of electrodes; and
    a power supply configured to generate an electric discharge between a workpiece and said each electrode to remove material from the workpiece, said power supply comprising an AC-to-DC component configured to output DC electric power, said power supply further comprising a multi-loop driver system comprising:
        a plurality of power loop circuits coupled to an output of said AC-to-DC component, each power loop circuit of said plurality of power loop circuits electrically-isolated from other power loop circuits of said plurality of power loop circuits, said each power loop circuit coupled to at least one electrode of said plurality of electrodes and said each power loop circuit comprising a transistor configured to switch between an ON state and an OFF state to generate a pulse of the DC electric power through said each power loop circuit; and
        a drive controller coupled to said plurality of power loop circuits, said drive controller configured to transmit at least one control signal to at least one power loop circuit of said plurality of power loop circuits to drive said AC-to-DC component to generate the electric discharge.

2. The EDM system in accordance with claim 1, wherein said electrode set further comprises a plurality of insulator components positioned between adjacent electrodes of said plurality of electrodes.

3. The EDM system in accordance with claim 1, wherein said each electrode of said plurality of electrodes is fabricated from a substantially planar material.

4. The EDM system in accordance with claim 1, wherein said transistor is a metal-oxide-silicon field-effect type transistor.

5. The EDM system in accordance with claim 1, wherein said multi-loop driver system further comprises a plurality of current sensors, wherein said each power loop circuit comprises a respective current sensor of said plurality of current sensors operatively coupled to said transistor and operatively coupled to said drive controller for sensing an amount of current flowing through said transistor, and wherein said drive controller is configured to switch said transistor to the OFF state if an amount of current flowing through said transistor exceeds a predetermined threshold value.

6. The EDM system in accordance with claim 1, wherein said multi-loop driver system further comprises a plurality of voltage sensors, wherein said each power loop circuit comprises a respective voltage sensor of said plurality of voltage sensors operatively coupled to said transistor and operatively coupled to said drive controller for sensing an amount of gap voltage between the workpiece and said at least one electrode.

7. The EDM system in accordance with claim 1, wherein said multi-loop driver system further comprises a transistor-transistor logic to metal-oxide-silicon (TTL-to-MOS) driver configured to receive the at least one control signal and transmit at least one MOS signal having an increased current and increased voltage output level relative to the control signal, to said at least one power loop circuit.

8. The EDM system in accordance with claim 7, wherein said at least one power loop circuit further comprises an optoisolator configured to electrically isolate said transistor from said drive controller.

9. The EDM system in accordance with claim 8, wherein said at least one power loop circuit further comprises a driver component coupled between said optoisolator and said transistor, wherein said driver component is configured to transmit a current sufficient to change the state of said transistor.

10. An electric discharge machining (EDM) system comprising:
    an electrode set comprising a plurality of electrodes, each electrode of said plurality of electrodes electrically-isolated from other electrodes of said plurality of electrodes;
    a power supply comprising an AC-to-DC component configured to output DC electric power, and a plurality of power loop circuits coupled to an output of said AC-to-DC component, each power loop circuit of said plurality of power loop circuits electrically-isolated from other power loop circuits of said plurality of power loop circuits, wherein said each power loop circuit is coupled to at least one electrode of said plurality of electrodes and is configured to transmit pulsed DC electric power to said at least one electrode independent of another said each power loop circuit, and wherein said each power loop circuit comprises a transistor configured to switch between an ON state and an OFF state to generate a pulse of the DC electric power through said each power loop circuit;
    a translation apparatus coupled to said electrode set and configured to adjust a position of said electrode set relative to a workpiece; and
    a controller coupled to said translation apparatus and said power supply, said controller configured to control said translation apparatus to adjust a position of said electrode set relative to the workpiece based on an amount of gap voltage measured between said electrode set and the workpiece.

11. The EDM system in accordance with claim 10, wherein said power supply further comprises a drive controller coupled to said plurality of power loop circuits, said drive controller configured to transmit at least one control signal to said each power loop circuit to drive said AC-to-DC component to generate an electric discharge between said electrode set and the workpiece.

12. The EDM system in accordance with claim 11, wherein said drive controller transmits a first control signal to a first power loop circuit of said plurality of power loop circuits, and a second control signal to a second power loop circuit of said plurality of power loop circuits, wherein said first control signal and said second control signal are in phase and configured to generate simultaneous electric discharges between said first and second power loop circuits and the workpiece.

13. The EDM system in accordance with claim 11, wherein said drive controller transmits a first control signal to a first power loop circuit of said plurality of power loop circuits, and a second control signal to a second power loop circuit of said plurality of power loop circuits, wherein said first control signal and said second control signal are out of phase and configured to generate sequential electric discharges between said first and second power loop circuits and the workpiece.

14. The EDM system in accordance with claim 11, wherein said power supply further comprises a transistor-transistor logic to metal-oxide-silicon (TTL-to-MOS) driver configured to receive the at least one control signal and transmit at least one MOS signal having an increased current and increased voltage output level relative to the control signal, to said each power loop circuit.

15. The EDM system in accordance with claim 11, wherein said each power loop circuit comprises:
   an optoisolator configured to electrically isolate said transistor from said drive controller; and
   a driver component coupled between said optoisolator and said transistor, wherein said driver component is configured to transmit a current sufficient to change the operating state of said transistor.

16. The EDM system in accordance with claim 10, wherein said electrode set further comprising a plurality of insulator components positioned between adjacent electrodes of said plurality of electrodes.

\* \* \* \* \*